May 26, 1931.  R. J. McCARTY, JR  1,807,000
GEARING
Filed Aug. 2, 1929  7 Sheets-Sheet 2
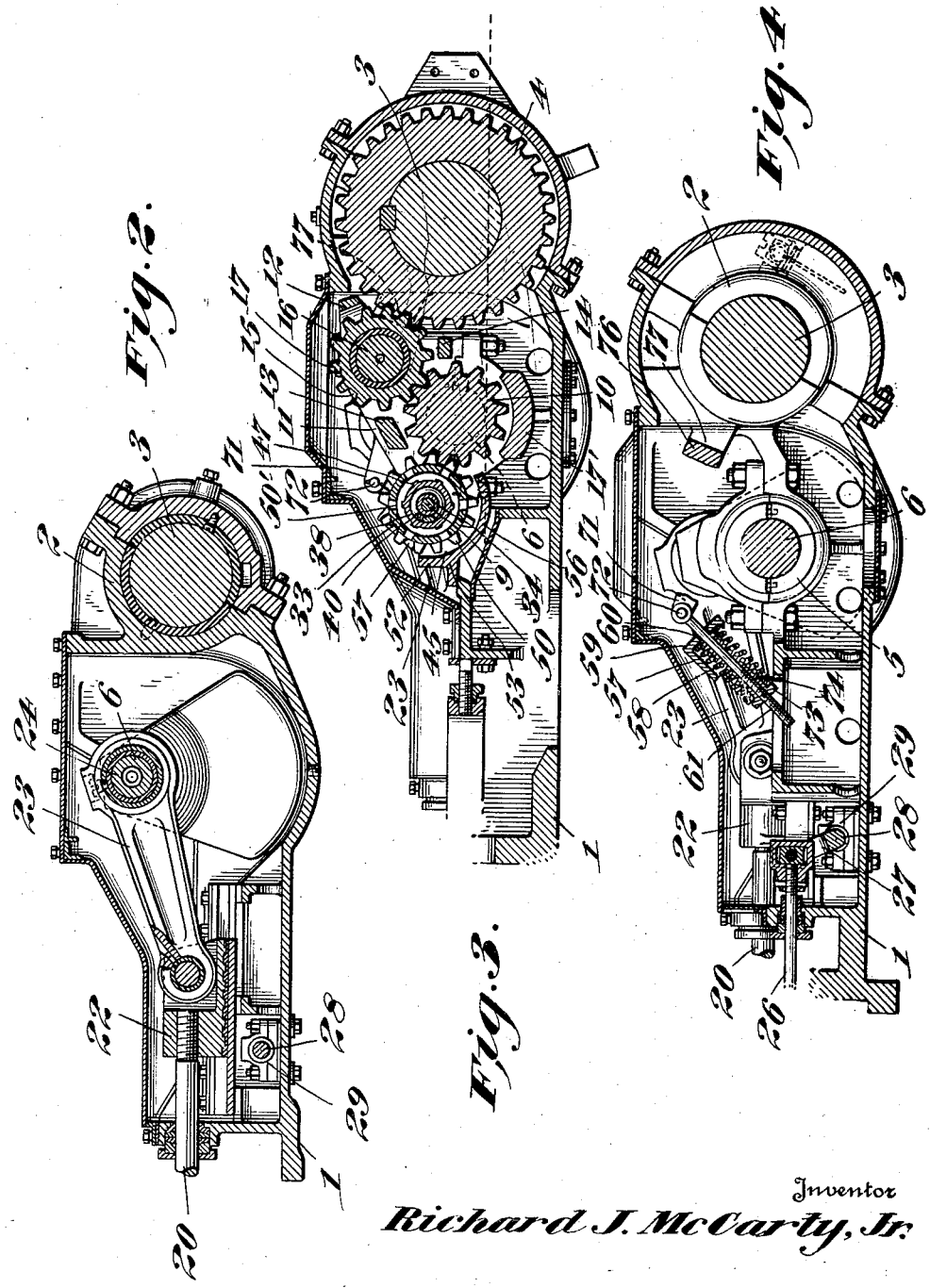
Inventor
Richard J. McCarty, Jr.
By R. S. C. Dougherty
Attorney

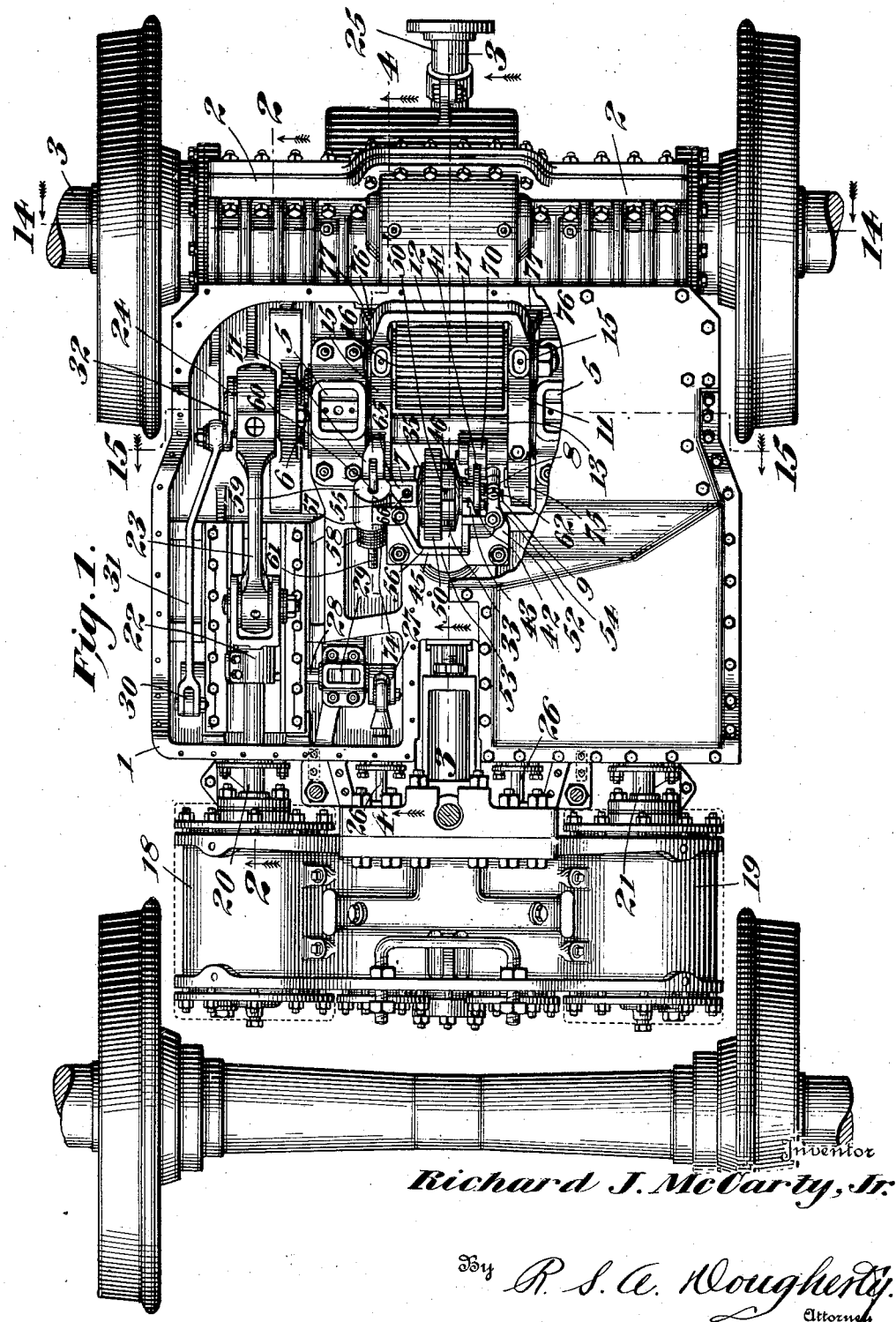

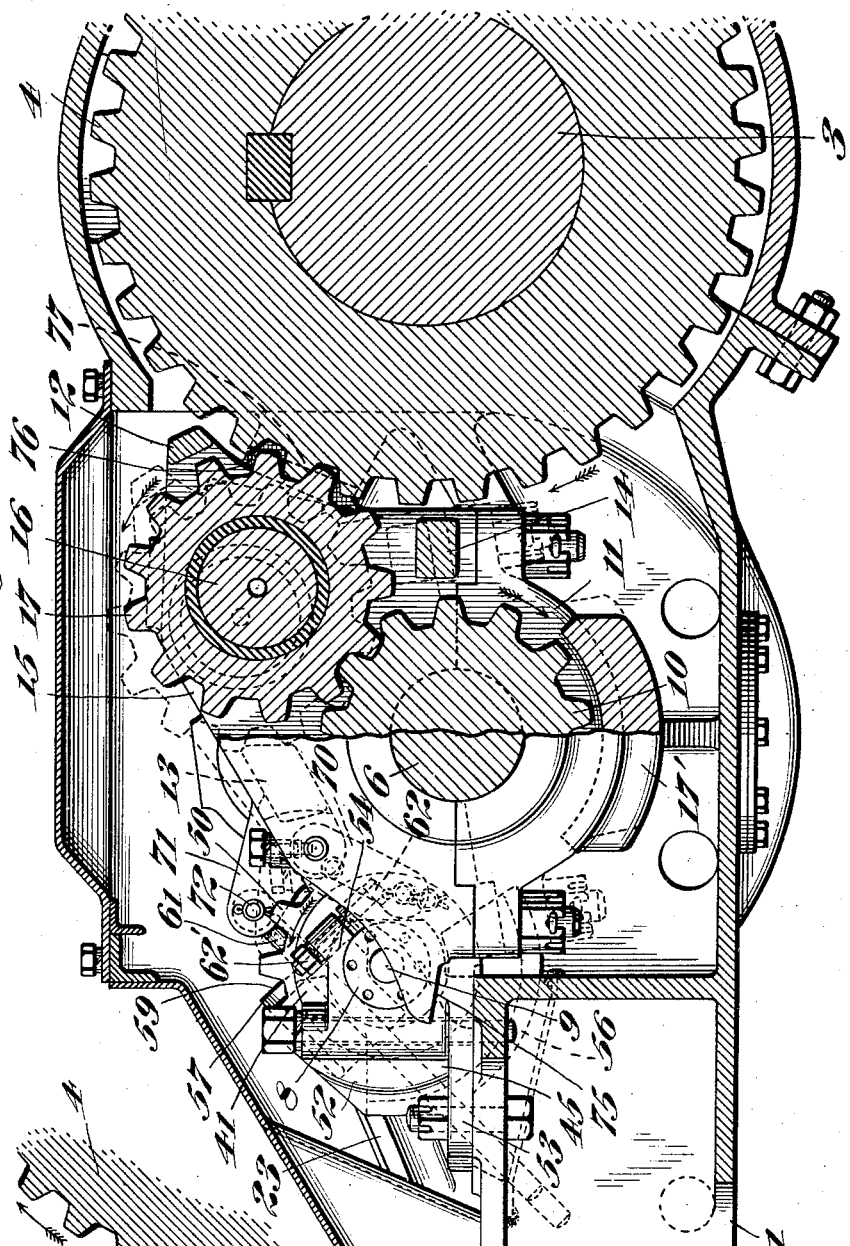

May 26, 1931.  R. J. McCARTY, JR  1,807,000
GEARING
Filed Aug. 2, 1929   7 Sheets-Sheet 4
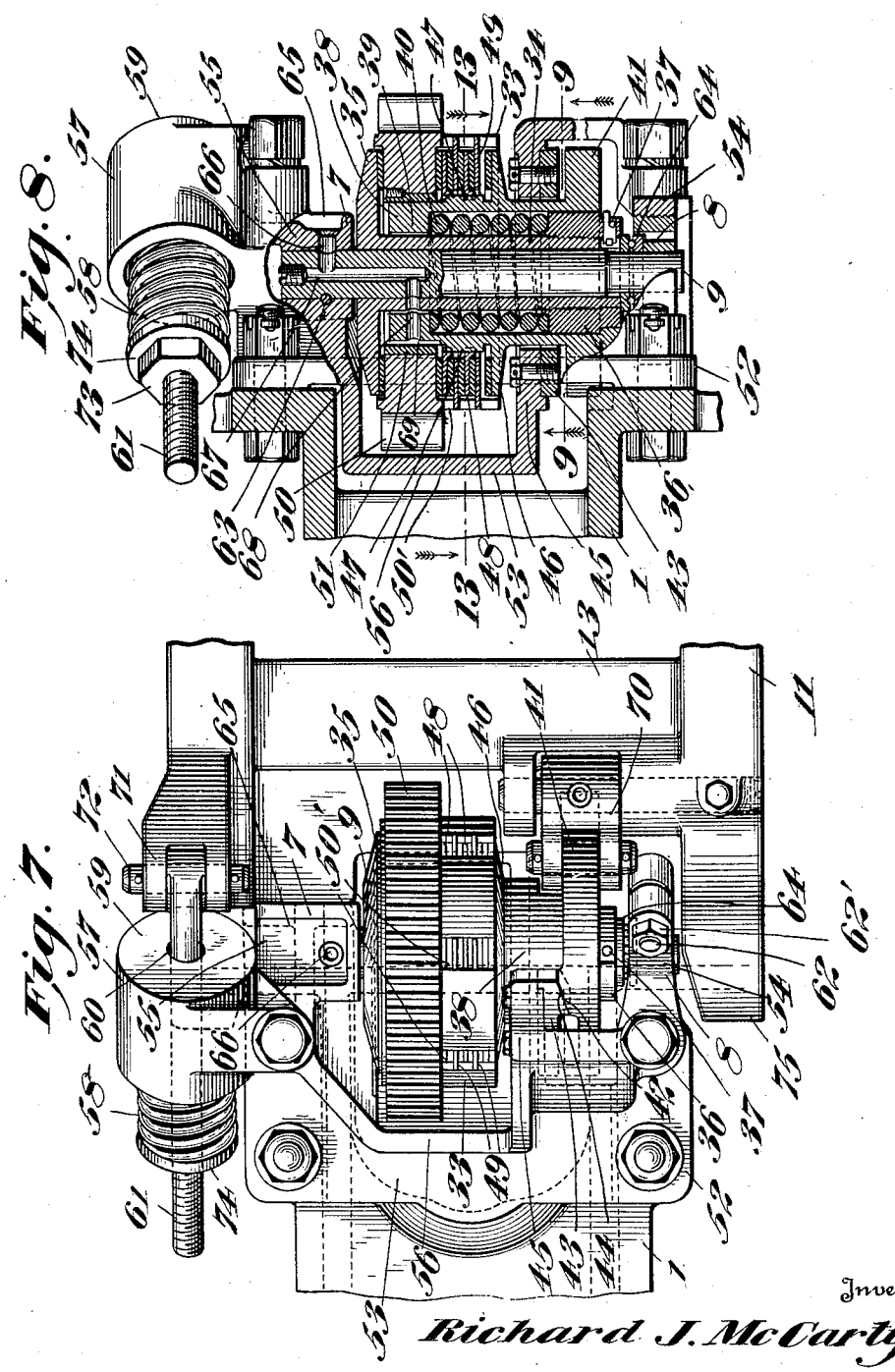
Inventor
Richard J. McCarty, Jr.
By R. S. A. Dougherty.
Attorney May 26, 1931.    R. J. McCARTY, JR    1,807,000
GEARING
Filed Aug. 2, 1929    7 Sheets-Sheet 5
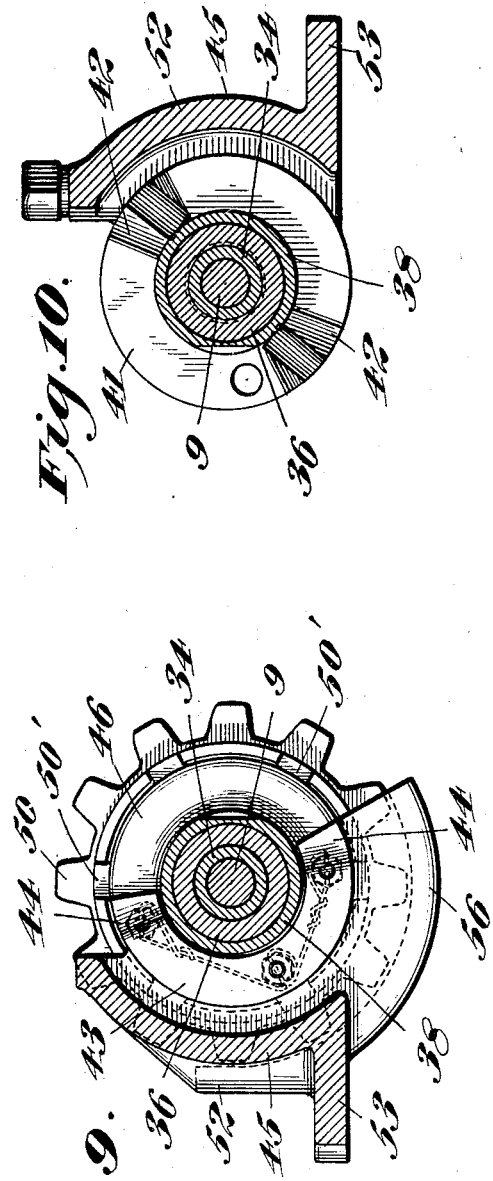
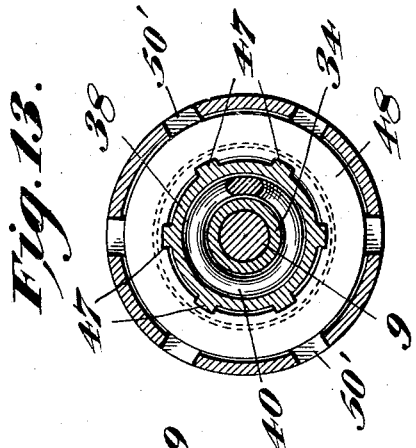
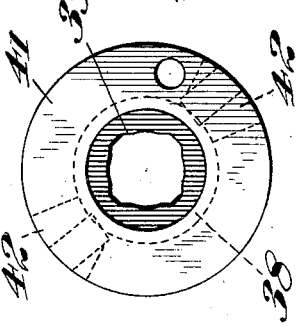
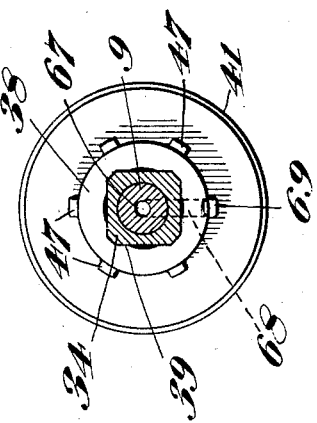
Inventor
Richard J. McCarty, Jr.
By R. S. C. Dougherty.
Attorney

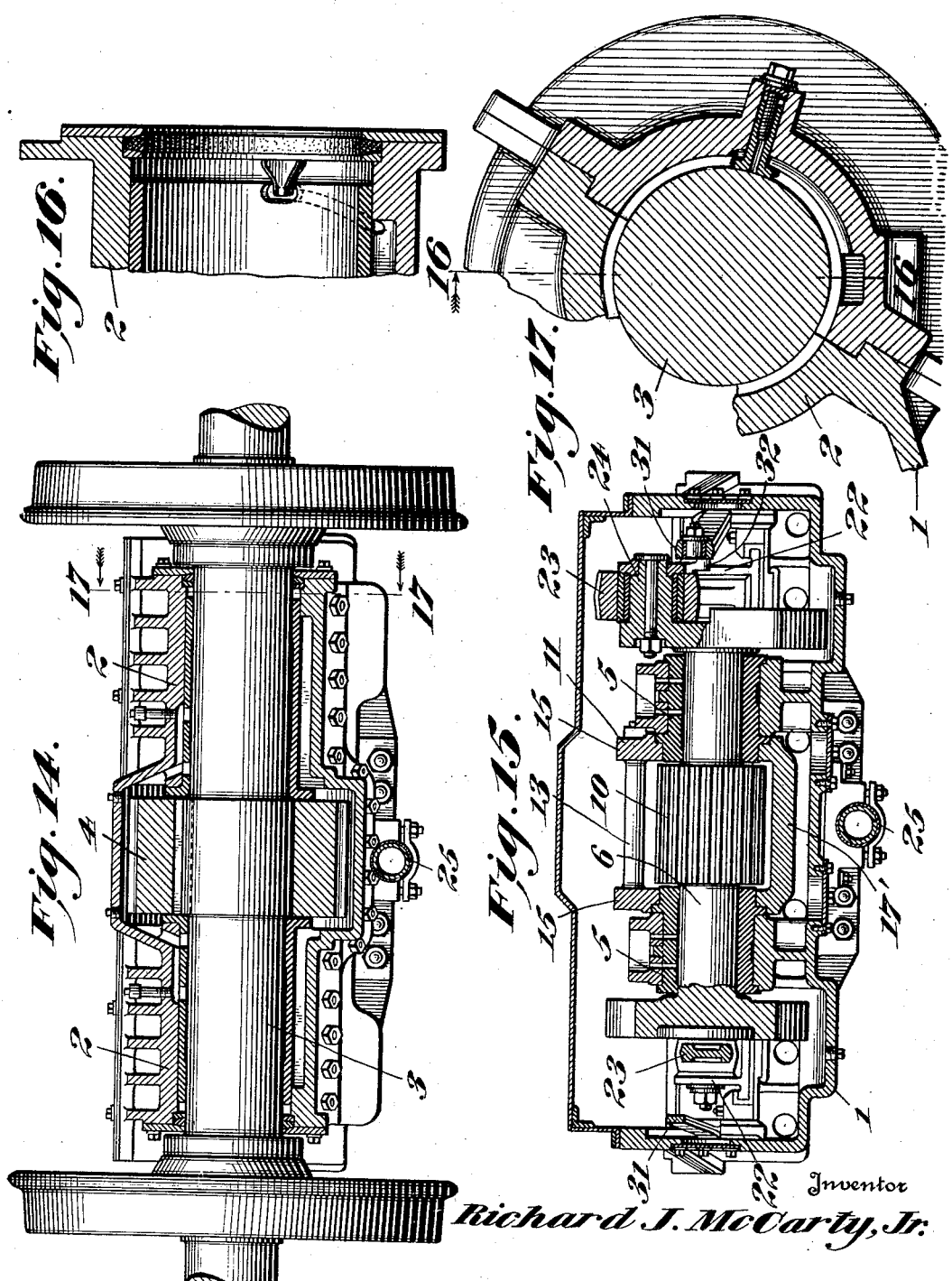

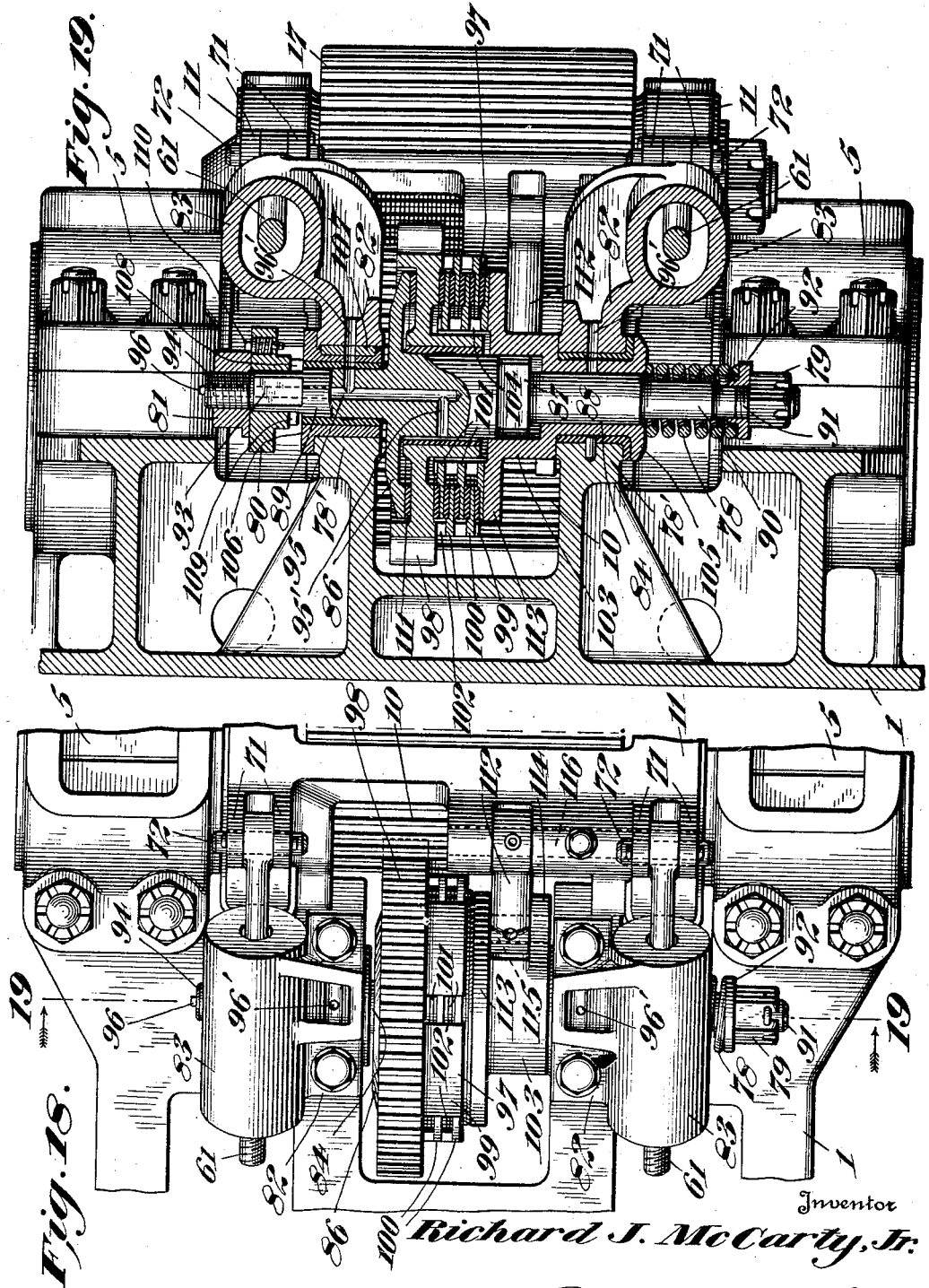

Patented May 26, 1931

1,807,000

UNITED STATES PATENT OFFICE

RICHARD J. McCARTY, JR., OF BETHLEHEM, PENNSYLVANIA, ASSIGNOR TO BETHLEHEM STEEL COMPANY, A CORPORATION OF PENNSYLVANIA

GEARING

Application filed August 2, 1929. Serial No. 382,930.

My invention relates to auxiliary motors for locomotives adapted to be connected to a normally idle axle for the purpose of supplying additional tractive force to assist the main locomotive in starting and climbing steep grades.

One of the objects of my invention is to provide a friction to automatically cause the entrainment of the auxiliary motor gear with a normally idle axle of a railway vehicle by virtue of the operation of said motor.

Another object of my invention is to provide means for causing the effective engagement of the friction elements of the entrainment gear when the motor is disconnected from the axle and to disengage said elements when the motor is in driving relation with the axle.

Another object of my invention is to provide a means for lubricating the friction entrainment gear whereby the lubricant serves to prevent the sudden engagement of the friction elements of said gear when the latter moves toward its disentrained position.

The novel features will be more fully understood from the following description taken with the drawings in which:

Fig. 1 is a top plan view of an auxiliary truck motor with the operating parts shown exposed to more clearly illustrate the application and relation of my invention;

Fig. 2 is a vertical longitudinal section taken on the line 2—2 of Fig. 1;

Fig. 3 is a vertical longitudinal section taken on the line 3—3 of Fig. 1;

Fig. 4 is a vertical longitudinal section taken on the line 4—4 of Fig. 1;

Fig. 5 is an enlarged view similar to Fig. 3 but with a portion to the left shown as an outside view;

Fig. 6 shows the engaging relation and the direction of rotation between the idler and the driven gears;

Fig. 7 is an enlarged top plan view of the friction clutch as mounted on the jack-shaft, and its connection to the rocker-bracket;

Fig. 8 is a cutaway sectional view of the clutch and clutch-bracket and illustrates the typical construction and assembly of the clutch in the bracket;

Fig. 9 is a sectional view taken through the jack-shaft on line 9—9 of Fig. 8 showing the cam plate as fixed to the bearing-bracket supporting the jack-shaft;

Fig. 10 is a sectional view taken substantially on the same line as Fig. 9 but looking in the opposite direction and showing the cam faces on the rotatable cam-sleeve;

Fig. 11 is a sectional view through the jack-shaft taken at the far end of the cam-sleeve and looking in the direction of the arrows relative to line 13—13 of Fig. 8;

Fig. 12 is an outside end view looking on the face of the near end of the cam-sleeve in the direction of the arrows relative to line 9—9 of Fig. 8;

Fig. 13 is a cross sectional view through the clutch taken on the line 13—13 of Fig. 8;

Fig. 14 is a sectional view taken longitudinally of the axle on the line 14—14 of Fig. 1;

Fig. 15 is a sectional view taken longitudinally of the crank-shaft on the line 15—15 of Fig. 1;

Fig. 16 is a sectional view taken on the line 16—16 of Fig. 17 and coincident with the line 17—17 of Fig. 14 and shows an oil wiping device near the end of the bearing;

Fig. 17 is a cross sectional view through the axle and bearing taken on the line 17—17 of Fig. 14;

Fig. 18 shows a plan view of a modified form of clutch arrangement similar to Fig. 7; and Fig. 19 shows a vertical sectional view of the modified form of clutch as shown in Fig. 18.

As illustrated in the accompanying drawings, 1 indicates the frame or bed-plate of the auxiliary motor having journal bearings 2—2 by means of which it is supported at its forward end on the load bearing axle 3, upon which is centrally mounted the driven gear 4. The rear end of the frame being suspended in any approved manner, as from the truck frame (not shown) or it may be supported on the rear axle if desired. The frame is also formed at intermediate points with spaced bearings 5—5 for the crank-shaft 6, and bearings 7 and 8 for the jack-shaft 9.

A driving gear 10 is mounted centrally on crank-shaft 6 within a rocker-frame 11 which is journaled about the crank-shaft 6 on each side of gear 10. The sides of the rocker-frame are connected by means of ribs 12, 13 and 14. The two sides of the rocker-frame are formed with upwardly extending portions 15 within which is mounted the ends of the stub shaft 16 for idler gear 17 which is in constant mesh with and driven by gear 10 on crank-shaft 6. A double bearing cap 17' is secured to the under side of rocker 11 in which bushings 5 are mounted. This construction allows the rocker which carries idler gear 17 to rotate freely about shaft 6.

The auxiliary motor preferably consists of a pair of cylinders 18 and 19 having pistons of conventional design and connected by piston-rods 20 and 21 to cross-heads 22 and operating pitmans 23, the latter being connected to cranks 24 keyed to the outer ends of crank-shaft 6.

The supply of fluid pressure to cylinders 18 and 19 may be controlled in any approved manner by the engineer in the cab, enters the cylinders by means of supply pipe 25 extending rearwardly to the steam chests which are provided with slide valves of approved design. The slide valves are connected through piston-rods 26 to rocker-arms 27 on the rock-shafts 28 which are journaled in bearings 29 mounted on frame 1. Similar rocker-arms 30 are attached to the outer ends of the rock-shafts which in turn are connected by means of pitmans 31 to the crank-arms or eccentrics 32, keyed to the outer ends of crank-shaft 6.

Mounted on jack-shaft 9 is a rotatable friction clutch 33, comprising a shaft-sleeve 34 formed at one end with an annular flange 35 while the opposite end of the sleeve is threaded to receive a nut 36. The threaded end of the sleeve is formed with a shoulder of reduced diameter to provide a stop for nut 36. The nut is provided with a locking pin 37 which is adapted to fit into a slotted opening at the near end of sleeve 34.

Slidably mounted on clutch sleeve 34 is a tubular clutch sleeve 38 which is formed at its far end 39 with a square opening to slidably receive a similar squared portion of sleeve 34, while the other end is counterbored to receive nut 36. The counterbore extending from the near end of the member to a point short of its far end, provides an annular space between the counterbored portion of clutch-sleeve 38 and the outside of sleeve 34 adapted to house compression spring 40. The near end of the clutch sleeve is formed with a circular flange 41 which is provided on its inside face with inclined cam shaped wedges 42 adapted to coact against a fixed cam-plate 43 having corresponding inclined cams 44. The cam-plate 43 being fixedly attached to a stationary bracket member 45.

Intermediate the ends of clutch-sleeve 38 is formed an annular flange 46 to which a ring of friction lining is attached, and adjacent flange 46 the clutch-sleeve is provided with a series of splined keys 47 for receiving corresponding notches of the clutch-plates 48. Similar clutch-plates are interposed between the plates as attached to the clutch-sleeve and are mounted within the casing of clutch-gear 50. The part of the clutch-casing which houses the friction plates 49 is slotted as shown at 50' to allow the fingers at the edge of the plates 49 to be engaged by the clutch member. Friction lining is provided for the plates 48 which are attached to the clutch sleeve 38.

Interposed the friction plates just mentioned and the annular flange 35 of the shaft-sleeve 34 is provided a toothed gear wheel 50 which is rotatably mounted on clutch-sleeve 38. The bore of the gear is fitted with a bushing 51 which is held in place by means of a stud-screw. The two outside faces of the gear are machined to provide smooth rubbing surfaces for the friction material secured to plates 48 and to the inside face of annular flange 35.

Lubrication for the rubbing surfaces of the friction members is provided through holes bored in jack-shaft 9, and grooves which conduct the lubricant to both sides of gear 50 hereinafter more fully described.

The clutch may be assembled as a unit by first assembling the friction plates in their proper alternating relation on clutch-sleeve 38, then placing gear 50 over the cam-sleeve and in registering relation to the outside fingers on plates 49, followed by the insertion of shaft-sleeve 34 so that the square portion of the shaft engages the squared opening of clutch-sleeve 38. The spring 40 is then put into place between the two sleeves 34 and 38 and nut 36 is then threaded over the end of sleeve 34 to compress the spring until the outside shouldered portion of the nut comes flush with the outside face of the circular flange 41 of the cam-sleeve. The nut is then locked to sleeve 34 by pin 37 which is secured in place by means of a split pin or similar device. This whole assembly of the clutch is indicated by the numeral 33.

Jack-shaft 9 on which clutch 33 is mounted, is supported by a bracket 52, which comprises a U-shaped base portion 53, housings 54 and 55. A circular portion 56 forms a connection between housings 54 and 55 and serves the purpose of a strengthening member and at the same time provides for the securing of cam-plate 43 thereto. At the far side of the bracket and integral therewith is a cylindrical portion 57 which is adapted to house a spring 58 hereinafter referred to. The spring housing 57 is shaped to form a cylinder, open at its lower end to receive spring 58 but closed at its upper end 59 to provide an abutment for the spring. A hole 60 is provided for spring bolt 61. The outer end of housing 54 is split and formed with lugs through which a bolt 62 is passed thus providing a clamp for bearing 8 in which jack-shaft 9 is mounted.

After the clutch has been assembled as a unit as heretofore described, it is placed in position in bracket 52, and jack-shaft 9 is pushed through the clutch from the near end into housing 55 where it is locked into fixed position by means of pin 63 driven from the open side of the housing. A frictionless washer 64 is then slipped over the near end of shaft 9 which is followed by the screw threaded bearing 8 which provides for end adjustment. After the proper adjustment is obtained, nut 62′ is tightened which clamps the bearing and securely locks it in place.

The gearing and all the working parts as a whole are enclosed and seated within the frame which is adapted to contain a bath of oil whereby all of the parts will be automatically lubricated, either by direct contact with the oil bath or by the splash of the immersed parts. The smooth and proper functioning of the clutch depends greatly upon its lubrication, therefore, special provision had been made for its lubrication.

Referring to Figs. 7 and 8, it will be noted that on the top of housing 55 a pocket 65 is formed to collect oil as splashed by gears 4, 10 and 17, and flows by gravity through the hole 66 into the bored hole 67 of jack-shaft 9 and out through hole 68, along channel 69 to both sides of gear 50, where it is thrown outwardly by centrifugal action against the inner peripheries of the friction plates 48 and 49. As the flow of oil can only take place when the engine is running, and therefore, with the clutch released, a clearance will exist between the faces of the friction plates and the adjacent metal surfaces. Therefore, whatever oil passes through channel 69, and out against the inner periphery of the friction plates, will be gradually worked out through these clearances. These clearances being relatively small, capillary attraction and the inherent viscosity of the oil will be sufficient to maintain films of lubrication on the faces of the clutch plates.

When the steam to the engine is cut off and gear 4 continues to rotate, idler 17 disengages from gear 4, carrying with it rocker 11 which is connected to cam-sleeve 38 by means of link 70. The rotation thus imparted to sleeve 38 and the resulting longitudinal motion thereof relative to shaft 9 due to the action of cam 42 on cam 43 and spring 40, causes the reengaging of the clutch-plates. As the clutch-plates approach each other, the films of oil adhering thereto cushion the contact of the friction surfaces and prevent the immediate application of the friction component and permit the plates to slide upon each other with less friction. Thus, after the idler gear has moved to its demeshed position a perceptible interval of time elapses before the friction plates come into effective contact sufficiently to return the idler into its meshed position with respect to the driven gear. Such interval of time being sufficient to allow the moving parts of the engine to stop, after the steam is turned off, before the friction plates are forced into effective engagement.

During a short interval of time, after the auxiliary engine ceases to operate, the action of spring 40, exerting pressure to all the friction faces of the clutch-plates, forces this film of lubrication from between the friction faces of the plates allowing their intimate contact, and upon starting the auxiliary engine again, the friction component is available to reengage the gears. It will be easily seen that the provision of my lubrication arrangement eliminates the tendency of the friction clutch from causing the idler gear to oscillate into and out of mesh with the driven gear as the engine is brought to rest and eliminates a certain wear and tear which would otherwise occur.

The spring 58 is provided to exert a downward force on bolt 61 which is fastened to extending jaws 71 of rocker 11 by means of pin 72. Bolt 61 is threaded at its lower end and provided with a nut 73 and washer 74 as a means of spring adjustment. The spring tends to hold rocker 11 in its rearward position, corresponding to the normally disengaged position of idler-gear 17 as shown by the dotted lines in Fig. 5. A stop 75 is provided at the end of rocker 11 to limit its rearward movement when idler 17 is in its disengaged position. A similar stop 76 is provided at the forward end of rocker 11 which is adapted to abut against a fixed portion 77 on frame 1 to limit its forward movement which corresponds to the engaged position of idler 17 as shown in full lines in Fig. 4.

Referring to the modified form of clutch assembly as illustrated in Figs. 18 and 19, the general features and principle of operations of which are substantially the same as the clutch shown in Figs. 7 and 8, the differences between the two forms being structural features only.

In the modified clutch the supporting bearings 78′ have been spaced nearer to each other than in the form as shown in Figs. 7 and 8. This arrangement permits spring 78 being located on the outside of the bearing where adjusting nut 79 is more accessible. This feature also applies to cam-sleeve 80 and its adjusting nut 81.

In place of bracket 52 as shown in Figs. 7 and 8, two bearing-caps 82 are provided for holding the clutch in place. Each cap is formed with a cylindrical spring housing 83 which houses the retracting springs. The springs tend to hold the rocker-frame 11 in its rearward position.

The jack-shaft 84 in the modified form comprises a central or body portion having an annular flange portion 86 integral therewith. The end of the body portion opposite flange 86 is formed with a squared portion 87. Extending outwardly from journal 88 is a reduced portion 90 over which spring 78 is assembled. The extreme right hand end of the shaft is formed with a threaded portion 91 of reduced diameter over which a collar 92 fits. The collar acts as a washer for nut 79 and an abutment for spring 78. Extending outwardly from journal 89 is a squared portion 93 and a threaded portion 94. An oil hole 95 is bored centrally of the shaft and plugged by means of a threaded plug 96. A hole 96′ is drilled in journal portion 89 to communicate with the centrally bored hole 95 and another hole 95′ is drilled into the body portion, also communicating with the central hole. Oil is supplied to the central hole of the shaft through holes communicating with pockets of the bearing caps 82. The feature of special lubrication to cause its smooth operation applies also to this form of clutch, as heretofore described relative to the clutch as shown in Figs. 7 and 8.

Mounted on jack-shaft 84 is a friction clutch 97, comprising a gear 98 rotatably mounted on shaft 84. An annular casing 99 extends from the rim portion of the gear and forms a housing for friction plates 100 and 101. The casing 99 is provided with slots 102 into which projecting portions of plates 100 extend. Portions 87 and 88 of the jack-shaft ride in a sleeve 103 comprising an annular ring portion 104 which is slotted in a similar manner to annular portion 99, into which projections of plates 101 extend. That portion of sleeve 103 which houses the body portion 87 of the jack-shaft is made square to conform with the square on the shaft so that these parts will turn in unison. Sleeve 103 is journaled in bearing 77 which is formed by frame 1 and bearing cap 82. A flanged portion 105 is provided at the end of the sleeve to prevent longitudinal movement relative to jack-shaft 84.

Journal 89 of the jack-shaft is mounted in a cam-bushing 106 which is prevented from turning in bearing 77 by means of a key 107 which acts as a lock between cap 82 and the sleeve. On the outer face of bushing 106 are formed cam members 108 which are adapted to coact against similar cams 109 of cam-sleeve 80 which turns with jack-shaft 84.

A spring pressed plunger 110 is provided in cam-sleeve 80 for the purpose of preventing the turning of nut 81 relative to cam-sleeve 80 after proper adjustment between the two cam members has been obtained.

Suitable friction material 111 is secured to the inside face of flange 86 and to both sides of plates 101 to provide the necessary friction component for the successful operation of the clutch.

The clutch is assembled as a unit, and in combination with cam-bushing 106 is positioned in bearings 77 and secured in place by means of bearing-caps 82.

A link 112 is provided to connect clutch-sleeve 103 with rocker 11. The lower end of the link is positioned between the annular flange portion 113 of sleeve 103 and the outwardly projecting ear portion 114. A pin 115 secures the link to the sleeve. The upper end of link 112 is fastened to rocker 11 by means of pin 116 which is driven from the outside of the rocker.

The operation of my entrainment gear is as follows:

Assuming that the locomotive is traveling forward and the parts of the auxiliary motor are in the position as indicated by the dotted lines in Fig. 5, which is the disengaged position when the auxiliary motor is out of operation, and it is desired to cut in the motor to develop additional tractive force. The engineer opens a valve (not shown) admitting steam into the supply pipe 25 which conducts it to the steam chests, thence to the cylinders 18 and 19 respectively.

As the piston rods 20 and 21 are reciprocated by the pressure of the steam, they transmit rotary motion to the crank-shaft 6 through their cross-heads, pitmans and crank-arms which are connected to crank-shaft 6. As the crank-shaft rotates, the gear 10 keyed thereto transmits rotary motion to the idler-gear 17 and gear 50 in the direction of the arrows as shown in Fig. 5.

Referring to Figs. 5, 7 and 8 and for the purpose of illustration, it may be assumed that idler 17 is in its disengaged position as shown by the dotted lines in Fig. 5 and that the friction plates of the clutch are in their engaged or friction relation to each other and with gear 50 as shown in Fig. 8. In this relation it will be obvious from Fig. 5 that when idler 17 is in its disengaged position, that rocker-frame 11 will have been rotated in a counter-clockwise direction relative to shaft 6, and since clutch sleeve 38 is connected to rocker-frame 11 by means of link 70, a clockwise movement has been imparted to the clutch-sleeve. Under these conditions, the rotatable cam 42 has assumed a position relative to the fixed cam 43 as shown in Fig. 7. The clockwise rotation of cam 42 has permitted spring 40 to move the clutch-sleeve 38 longitudinally relative to shaft 9, which causes pressure between clutch-plates 48 and 49 and gear 50 and flange 35 of shaft sleeve 34, thus establishing the engaged or operative position of the clutch relative to the disengaged position of idler-gear 17.

Upon admission of fluid pressure to the motor, gear 50 being operatively connected to gear 10, will be revolved in a counter-clockwise direction, and since the plates of the clutch are engaged, it will impart a similar rotary motion to clutch-sleeve 38 which in turn will cause rocker 11 to rotate in a clockwise direction about its axis carrying with it idler 17 into engagement with gear 4, thus establishing communication between the driving and driven trains.

During the period of engagement of gears 17 and 4, cam 42 is being rotated in a counterclockwise direction which causes clutch-sleeve 38 to be moved outwardly against the pressure of spring 40, and at the same time relieves the pressure between the friction faces of the clutch-plates and between gear 50 and shaft sleeve 34, thus permitting gear 50 to continue to revolve freely about its axis. The position of the cam surfaces with relation to each other are so established that the release of pressure takes place after the teeth of the idler gear 17 have engaged those of the axle-gear 4 but before the gears are fully in mesh as shown in Fig. 6. Further rotation of rocker-frame 11 is obtained from the tooth pressure, the direction of which tends to draw the gears further into final meshing relationship.

Any forward movement of the rocker 11, pulls the return spring rod 61 upwardly and puts spring 58 under compression. When the steam supply to the auxiliary motor is arrested the pressure of the gear teeth tending to retain the gears in mesh is removed, and the compressed spring 58 returns the rocker-frame 11 to its initial disengaged position.

The return of rocker-frame 11 to its initial or disengaged position causes a clockwise rotation of clutch-sleeve 38, and the action of cam 42 on cam 43 permits spring 40 to move clutch-sleeve 38 inwardly which again establishes frictional engagement of the clutch elements, thus returning the clutch to its engaged position for a subsequent cycle of operation.

The ratio of movement obtained by the diameters of gears 10 and 50, the length of arm between the axis of jack-shaft 9 and pin 115 of link 70, and length of arm between axis of crank-shaft 6 and pin 116 of link 70, is such that the angular displacement of rocker-frame 11 is less than the angular movement of crank-shaft gear 10, resulting in an angular progression of idler-gear 17 about its axis. This results in a sweeping movement of the engaging teeth of gear 17 relative to the teeth of gear 4 and prevents a direct radial blow upon the teeth of the engaging gears. This is an important advantage not only in conserving the life of the gears but also in facilitating the entry of the gears into proper engagement.

The principle of operation of the modified form of clutch as shown in Figs. 18 and 19 being substantially the same as that shown in Figs. 7 and 8, it is considered not necessary to repeat the operation just described as the differences between the two forms are structural features only.

From the foregoing description considered in connection with the accompanying drawings, it will be obvious that I have provided an entrainment gear which is adapted to through the idler-gear into mesh with the driven gear in a predetermined manner through the means of a multiple plate clutch mounted upon a jack-shaft. The several parts of the entrainment gear are so constructed to cause the clutch to be effective when the idler-gear is disentrained from the driven gear, and to be ineffective when the idler-gear is in driving relation with the driven gear. Furthermore, the special provision for the lubrication of the clutch plates provides for its smooth operation, thereby reducing to a minimum, shock upon the mechanism. The mounting of the clutch on a shaft separate from the crank-shaft or the shaft carrying the idler-gear, allows the use of a clutch having large friction surfaces which permits low unit pressure with the accompanying low heat component, thereby insuring greater wearing qualities, dependability, less adjusting and service attention.

The separate mounting of the clutch also facilitates manufacture and assembling.

While I have shown my invention in two forms, it will be obvious to those skilled in the art that it is not so limited, but is susceptible of other changes and modifications without departing from the spirit thereof and I desire therefore that only such limitations shall be placed thereupon, as are imposed by the prior art, or as, are specifically set forth in the appended claims.

Having thus described my invention what I claim as new and desire to secure by Letters Patent is:

1. In an entrainment mechanism, a driven gear, a driving train including an idler gear which is normally out of engagement with the driven gear, a jack-shaft with fixed axis, and means mounted on said jack-shaft responsive to the operation of the driving train to produce the engagement of said idler and driven gear.

2. In an entrainment mechanism, a driven gear, a driving train including an idler gear which is normally out of engagement with the driven gear, a rocker frame for supporting the idler-gear, a jack-shaft, means mounted on said jack-shaft operatively connected with the driving train and said rocker frame to produce the engagement of said idler and driven gears upon the operation of said driving train, and means to render aforesaid means ineffective upon relative movement of said gears into said engagement.

3. In an entrainment mechanism, a driving train including an idler gear, a driven train including a driven gear, said gears being normally out of engagement with each other, a jack-shaft, a gear mounted on said jack-shaft in mesh with the driving train, a sleeve member mounted on said jack-shaft normally connected to the last mentioned gear, and means actuated by the operation of the driving train to disconnect the gear on said jack-shaft from said sleeve member and to effect engagement between said idler and driven gears.

4. In an entrainment mechanism, a driven gear, a driving train including an idler-gear which is normally out of engagement with the driven gear, a rocker-frame for supporting the idler gear, a jack-shaft, a clutch mounted on said jack-shaft operatively connected with the driving train, means connecting said clutch to the rocker-frame, means effective upon the operation of the driving train to actuate said clutch for automatically bringing the idler and driven gears into engagement, and means to render said clutch ineffective upon said engagement.

5. In an entrainment mechanism, a driven gear, a driving train including an idler-gear which is normally out of engagement with the driven gear, a rocker-frame for supporting the idler-gear, a jack-shaft, a clutch mounted on said jack-shaft operatively connected with the driving train, means connecting said clutch to the rocker-frame, means effective upon the operation of the driving train to actuate said clutch for automatically bringing the idler and driven gears into engagement, and means to render said clutch ineffective before the teeth of said idler and driven gears are fully meshed.

6. In an entrainment mechanism, a driving gear, a driven gear, an idler-gear which is constantly in mesh with the driving gear but normally out of engagement with the driven gear, a rocker-frame for supporting said idler-gear, a jack-shaft, a gear mounted on said jack-shaft in constant mesh with the driving gear, a sleeve member mounted on said jack-shaft, means connecting said sleeve member to said rocker-frame, engaging clutch members connecting said sleeve member to the gear mounted on said jack-shaft, and means to disengage said clutch members.

7. In an entrainment mechanism, a driving gear, a driven gear, an idler-gear which is constantly in mesh with the driving gear but normally out of engagement with the driven gear, a rocker-frame for supporting said idler-gear, a jack-shaft, a gear mounted on said jack-shaft in constant mesh with the driving gear, a sleeve member mounted on said jack-shaft, means connecting said sleeve member to said rocker-frame, means connecting said sleeve member to the gear mounted on said jack-shaft, and means to disconnect said sleeve from the last mentioned gear actuated by the operation of the driving gear.

8. In an entrainment mechanism, a driving gear, a driven gear, an idler-gear constantly in mesh with the driving gear, a rocker-frame for supporting said idler-gear so that the latter may move in a planetary manner about the axis of said driving gear, a jack-shaft, a gear mounted on said jack-shaft in mesh with the driving gear, a sleeve member mounted on said jack-shaft, a link connecting said sleeve member to said rocker member, means connecting said sleeve member to the gear mounted on said jack-shaft, and means to disconnect said sleeve member from the gear mounted on said jack-shaft.

9. In an entrainment mechanism, a driving gear, a driven gear, an idler-gear constantly in mesh with the driving gear, a rocker member for supporting said idler-gear mounted about the axis of said driving gear, and means effective upon the rotation of the driving gear to rotate the rocker about the axis of the driving gear toward the driven gear with an angular velocity less than the angular velocity of the driving gear causing said rotation of the rocker arm.

10. In an entrainment mechanism, a driving gear, a driven gear, an idler-gear constantly in mesh with the driving gear, a rocker member for supporting said idler-gear so that the latter may move in a planetary manner about the axis of said driving gear, and means effective upon the rotation of the driving gear to rotate the rocker and cause the idler-gear to move in a planetary manner about the axis of the driving gear toward the driven gear with an angular velocity less than the angular velocity of the driving gear whereby said idler-gear rotates about its axis during its planetary movement.

11. In an entrainment mechanism, a driven shaft including a driven gear, a driving train including an idler-gear which is normally out of engagement with the driven gear, and actuating means mounted in fixed spaced relation to said driven shaft and said driving train and responsive to the operation of the driving train to produce the engagement of said idler and driven gears.

12. In an entrainment mechanism, a driven shaft including a driven gear, a driving train including an idler-gear which is normally out of engagement with the driven gear, actuating means mounted in spaced relation to said driven shaft and said driving train and responsive to the operation of the driving train to produce the engagement of said idler and driven gears, said actuating means being operatively connected to said driving train when the idler-gear is disengaged from the driven gear, and means to disconnect said actuating means from said driving train when the idler-gear moves into driving relation with said driven gear.

13. In an entrainment mechanism, a driven shaft including a driven gear, a driving train including an idler-gear which is normally out of engagement with the driven gear, actuating means mounted in spaced relation to said driven shaft and said driving train and responsive to the operation of the driving train to produce the engagement of said idler and driven gear, said actuating means being operatively connected to said driving train when the idler-gear is disengaged from the driven gear, means to disconnect said actuating means from said driving train when the idler-gear moves into driving relation with said driven gear, and means constraining said gears apart.

14. In an entrainment mechanism, a driving train including an idler-gear, a driven train including a driven gear, said gears being mounted to permit of relative movement to and from meshing engagement with each other, a jack-shaft, means mounted on the jack-shaft engageable with the driving train to cause a torque exerting engagement effective when said idler and driven gears are in demeshed relation to move said gears into meshing engagement upon the operation of the driving train, and means to break said torque exerting engagement as the said gears move relatively into meshing engagement.

15. In an entrainment mechanism, a driving train including an idler-gear, a driven train including a driven gear, said gears being mounted to permit of relative movement to and from engagement with each other, a jack-shaft, means mounted on the jack-shaft and operated by the driving train to produce a torque exerting engagement effective when said idler and driven gears are in demeshed relation to move said gears toward meshing engagement as a result of the torque exerting engagement upon the operation of the driving train, and means to break the torque exerting engagement of said means mounted on the jack-shaft.

16. In an entrainment mechanism, a driving train including an idler-gear, a driven train including a driven gear, said gears being mounted to permit of relative movement to and from engagement, a jack-shaft, a torque exerting means mounted thereon actuated by the driving train to bring the latter into engagement with the driven train, said torque means being operatively connected to said driving train to move said gears into engagement as the result of said torque, means to break said torque, and means exerting a force tending to separate said gears.

17. In an entrainment mechanism, a driving train including an idler-gear, a driven train including a driven gear, said gears being normally out of engagement with each other, a shaft in spaced relation to said driving and driven trains, a disengageable torque exerting means mounted on said shaft to bring said driving and driven trains into engagement, and means operated by the driving train to actuate said torque exerting means to bring said gears into meshing engagement, and means to disengage said torque exerting means.

18. In an entrainment mechanism, a driving train including an idler-gear carried by a rocker-frame, a driven gear, said gears being mounted to permit of relative movement to and from engagement with each other, a jack-shaft, a gear mounted on said jack-shaft in constant mesh with the driving train, a sleeve member mounted on said jack-shaft, a link connecting said sleeve member to said rocker-frame, a disengageable friction means normally connecting said sleeve member to the gear mounted on said jack-shaft, and cam members to produce the release of said friction means when said idler-gear is moved toward meshing engagement with the driven gear.

19. In an entrainment mechanism, a driving train including an idler-gear carried by a rocker-frame, a driven gear, said gears being mounted to permit of relative movement to and from engagement with each other, a jack-shaft, a gear mounted on said jack-shaft in constant mesh with the driving train, a sleeve member mounted on said jack-shaft, means connecting said sleeve member to said rocker-frame, a disengageable friction means normally connecting said sleeve member to the gear mounted on said jack-shaft, pressure means to produce the engagement of said friction means, means to render said pressure means ineffective and thereby release the connection between said sleeve member and the gear mounted on said jack-shaft as said idler-gear is moved toward engagement with the driven gear, and means exerting a force tending to separate said idler and driven gears.

20. In an entrainment mechanism, a bed plate, a driving train including an idler-gear carried by a rocker-frame, a driven gear, said gears being mounted to permit relative movement to and from engagement, a jack-shaft, a gear mounted on said jack-shaft in constant mesh with the driving train, a sleeve member rotatably mounted in said bed plate, a cam bushing fixedly mounted in said bed plate, said jack-shaft being slidably mounted in said sleeve member and said cam bushing, a cam member slidably mounted on one end of said jack-shaft adjacent said fixedly mounted cam, a pressure member mounted on the other end of said jack-shaft, and friction members connecting the gear mounted on the jack-shaft and said sleeve, said pressure member being adapted to exert a pressure between said jack-shaft gear, said friction members and said sleeve to establish a driving connection between said driving train and said rocker-frame, said cam members being adapted to break said driving connection upon the engagement of said idler and driven gears.

21. In an entrainment mechanism, a bed plate, a driving train including an idler-gear carried by a rocker-frame, a driven train having a driven gear, said gears being mounted to permit relative movement to and from engagement, a clutch mounted separately from said driving and driven trains, said clutch comprising a flanged sleeve member rotatably mounted in said bed plate, a flanged shaft adapted to rotate said sleeve member and slidably mounted therein, a gear rotatably mounted on said shaft meshing with the driving train, friction plates disengageably connecting said shaft gear and said sleeve member, said shaft gear being positioned between the flange on said shaft and the flange of said sleeve, a bushing having cam faces fixedly mounted in said bed plate, a cam member slidably mounted on one end of said shaft adjacent said fixed cam bushing, pressure means adapted to establish pressure between said jack-shaft gear, said friction plates and said sleeve member, a link connecting said sleeve member and said rocker-frame, and means exerting a force tending to separate said idler and driven gears.

22. In an entrainment mechanism, a driven gear, a driving train including an idler-gear carried by a rocker-frame, said gears being mounted to permit relative movement to and from engagement, a jack-shaft, a clutch mounted on said jack-shaft operatively connected with the driving train and said rocker-frame, means effective upon the operation of the driving train to actuate the clutch for automatically bringing the idler and driven gears into engagement, means to disengage said gears, and means to lubricate said clutch.

23. In an entrainment mechanism, a bedplate adapted to contain a bath of lubricant, a driven train including a driven gear, a driving train including an idler-gear carried by a rocker-frame, said gears being mounted to permit movement to and from engagement, one or more of said gears in contact with said lubricating bath, a jack-shaft, a clutch mounted on said jack-shaft operatively connected with the driving train and said rocker-frame, means effective upon the operation of the driving train to actuate the clutch for automatically bringing the idler and driven gears into engagement, means to disengage said gears, and means to feed lubricant to the inside of said clutch as supplied by the splash of said gears to retard the operation of the clutch.

24. In an entrainment mechanism, a driven train including a driven gear, a driving train including an idler-gear carried by a rocker-frame, said gears being mounted to permit movement to and from engagement, a jack-shaft, a clutch mounted on said jack-shaft operatively connected with the driving train and said rocker-frame, said clutch having disengageable gripping members effective upon the disengaged position of said idler and driven gears and upon the operation of the driving train to transmit motion to the rocker-frame for automatically bringing the idler and driven gears into engagement, means to disengage said idler and driven gears, means to disengage said gripping members upon the engagement of said gears, and means to lubricate said gripping members while said members are so disengaged to retard their engagement with the operation of said driving train is discontinued.

25. In an entrainment machanism, a driving shaft including a driving gear, a rocker supported on the driving shaft and oscillatably mounted thereon, an idler-gear rotatably supported by said rocker and meshing with said driving gear, a driven gear, a jack-shaft, an auxiliary gear mounted on the jack-shaft meshing with the driving gear, a sleeve mounted on the jack-shaft, means mounted about the axis of the jack-shaft for locking the auxiliary gear to the sleeve, and means for releasing said locking means when the idler-gear is carried toward the driven gear by the rotation of the driving shaft.

26. In an entrainment mechanism, a driving shaft including a driving gear, a rocker located on the driving shaft, a stub shaft connected to the rocker, an idler-gear journaled on the stub shaft and meshing with the driving gear, a driven gear, an auxiliary shaft, a clutch member mounted on the auxiliary shaft for connecting the driving gear to the rocker, means for rotating the clutch member to actuate said rocker and thereby move said idler-gear into mesh with the driven gear, and means to release said clutch when the idler-gear is moved toward meshing position with respect to the driven gear.

27. In an entrainment mechanism, a driving shaft including a driving gear, a driven gear, a rocker rotatably supported on the driving shaft, a stub shaft secured to the rocker, an idle-gear located on the stub shaft and meshing with the driving gear, a jack-shaft, an auxiliary gear loosely mounted on the jack-shaft and driven by the driving gear, a sleeve mounted on the auxiliary shaft, spring pressed members for connecting the auxiliary gear to the sleeve, cam members for actuating the spring pressed members to release said auxiliary gear and said sleeve and permit rotation of said auxiliary gear when the idler gear engages the driven gear, and means to disengage said idler and driven gear.

28. In an entrainment mechanism, a driving shaft including a driving gear, a driven gear, a rocker member mounted on said driving shaft carrying an idler-gear constantly in mesh with said driving gear but normally out of engagement with the driven gear, a jackshaft, a clutch mounted on said jack-shaft and connected to the driving gear, said clutch comprising a gear, a sleeve, spring pressed friction means for frictionally engaging said clutch gear and said sleeve, a pair of coacting cams, said cams being mounted to oppose the action of said spring and thereby release said friction means when said idler-gear engages the driven gear.

29. In an entrainment mechanism, a driving shaft including a driving gear, a driven gear, a rocker member mounted on said driving shaft carrying an idler-gear constantly in mesh with said driving gear but normally out of engagement with the driven gear, a jackshaft, a clutch mounted on said jack-shaft and connected to the driving gear, said clutch comprising a gear, a sleeve, a link connecting said sleeve to said rocker, means for frictionally engaging said clutch gear and said sleeve, a spring for producing said frictional engagement, and cams operatively mounted to oppose the action of said spring and thereby release said friction engagement to permit said clutch gear to rotate when the idler-gear meshes with the driven gear.

30. In an entrainment mechanism, a driving gear, a driven gear, an idler-gear, a carrier member for said idler-gear, a clutch operable by movement of the carrier member to connect the driving gear to said carrier member, and means to retard the operation of said clutch.

31. In an entrainment mechanism, a driving gear, a driven gear, an idler-gear, a movable carrier member for said idler-gear, and means actuated by the driving gear to cause the movement of the carrier member at an angular velocity different from the angular velocity of the driving gear when causing said movement, said means being mounted in spaced relation to said idler gear.

32. In an entrainment mechanism, a driving gear, a driven gear, an idler-gear, a movable carrier member for said idler-gear, and means actuated by the driving gear to cause the movement of the carrier member at an angular velocity less than the angular velocity of the driving gear when causing said movement, said means being mounted in spaced relation to said idler gear.

In testimony whereof I hereunto affix my signature.

RICHARD J. McCARTY, Jr.